United States Patent [19]

Madau

[11] Patent Number: 5,389,911
[45] Date of Patent: Feb. 14, 1995

[54] ALARM SYSTEM FOR DETECTING GLASS BREAKAGE

[75] Inventor: Adrian Madau, Dearborn, Mich.

[73] Assignee: Ford Motor Company, Del.

[21] Appl. No.: 161,556

[22] Filed: Dec. 6, 1993

[51] Int. Cl.$^6$ ............................................. B60R 25/10
[52] U.S. Cl. .................................. 340/426; 340/428; 307/10.2; 70/371; 180/287
[58] Field of Search ............... 340/426, 428, 429, 430; 307/10.1, 10.2, 10.3, 10.4; 70/371; 180/287

[56] References Cited

U.S. PATENT DOCUMENTS

| | | |
|---|---|---|
| 3,643,756 | 2/1972 | Soreghy . |
| 3,947,837 | 3/1976 | Bitterice . |
| 4,263,584 | 4/1981 | Spirig . |
| 4,665,379 | 5/1987 | Howell et al. .................. 180/287 |
| 4,792,784 | 12/1988 | Kaplan .......................... 340/426 |
| 5,136,275 | 8/1992 | Madau et al. . |
| 5,172,093 | 12/1992 | Nose et al. . |
| 5,181,010 | 1/1993 | Chick ............................ 340/426 |
| 5,229,748 | 7/1993 | Ehringer et al. ............... 340/426 |

FOREIGN PATENT DOCUMENTS 3028399 2/1992 Germany .
2181586 4/1987 United Kingdom .

*Primary Examiner*—John K. Peng
*Assistant Examiner*—Nina Tong
*Attorney, Agent, or Firm*—Kevin G. Mierzwa; Roger L. May

[57] ABSTRACT

An alarm system for detecting glass breakage has a switch having an input terminal, output terminal, and control terminal. The input terminal is electrically connected to a power source such as a battery. An electrically conductive trace is formed on glass, and is electrically connected to the output terminal of the switch. A controller is electrically connected to the control terminal of the switch and controls the operation of the switch between conducting and non-conducting states. The controller measures and compares a reference output terminal voltage of said switching means while said switching means is in the conducting state, a second output terminal voltage while the switch is in the nonconducting state and a third output terminal voltage of the switch while the switching is in the conducting state. The controller generates a control signal in response to a comparison of said measured voltages.

19 Claims, 1 Drawing Sheet

ALARM SYSTEM FOR DETECTING GLASS BREAKAGE

BACKGROUND OF THE INVENTION

The invention relates generally to alarm systems for automobiles and more specifically to a method and apparatus for detecting the breakage of the windows of an automobile.

In an automotive vehicle it is desirable to activate an alarm in response to theft attempts as determined by certain sensed inputs. For example, the unauthorized opening of a cabin door or trunk lid triggers an alarm. Another sensed input desirable for triggering an alarm is glass breakage. Glass breakage has been sensed using a frangible screened trace (or patch) of electrically conductive material deposited on the glass. Security systems in buildings such as banks use such screened traces. However, in a building, the exterior wall at the periphery of the glass cannot be easily penetrated in order to access and tamper with the trace. In a motor vehicle, only sheet metal is present at the periphery of the glass. If the patch on glass systems typically employed on a building were employed on an automobile, the wiring of such systems might be reachable from the outside of the automobile by piercing the external sheet metal. Since the wiring can easily be reached by would-be intruders, previously known systems can easily be defeated by selectably shorting wires together.

SUMMARY OF THE INVENTION

One advantage of the present invention is that a glass breakage system is employed using a conductive patch on the external glass of the automobile in a manner that safeguards against an intruder successfully bypassing the breakage detector through tampering.

In a preferred embodiment of the present invention a switch having an input terminal, output terminal, and control terminal, provides a pulsed output. The input terminal is electrically connected to a power source such as a battery. An electrically conductive trace is formed on glass, and is electrically connected to the output terminal of the switch. A controller is electrically connected to the control terminal of the switch and controls the operation of the switch between conducting and non-conducting states. The controller measures and compares a reference output terminal voltage of the switching means while the switching means is in the conducting state, a second output terminal voltage while the switch is in the non-conducting state and a third output terminal voltage of the switch while the switching is in the conducting state. In response to the comparisons, the controller generates a control signal to indicate detection of glass breakage.

DETAILED DESCRIPTION OF THE DRAWINGS

Figure 1:
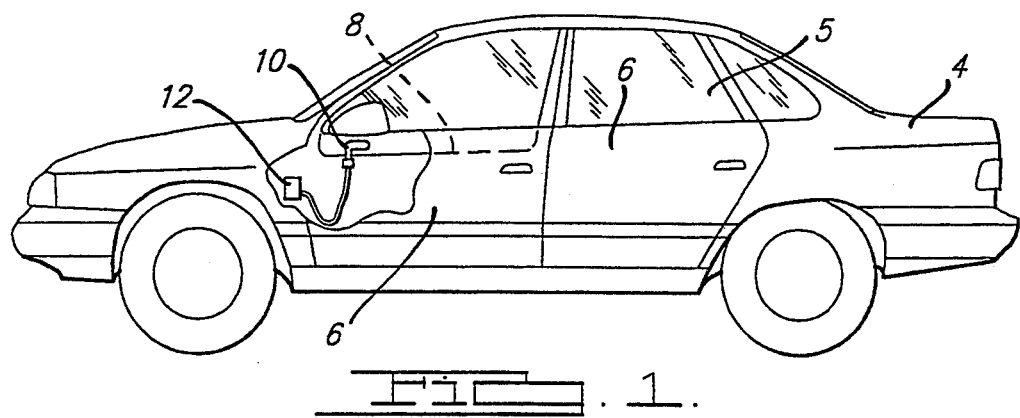
FIG. 1 is a side view of an automobile showing the placement of a glass trace used in the present invention.

Referring to FIG. 1, an automobile 4 is shown having a passenger compartment 5, at least one door 6 and at least one window 8. Vehicle door 6 typically has a sliding window 8 which extends into door 6. Windows 8 are preferably made of tempered glass commonly found on automobiles. On a portion of window 8, a conductive frangible trace 10 is screened to the glass. Screening prevents later alteration or removal of trace 10 without breaking trace 10. Furthermore, the continuity of Trace 10 is lost whenever the supporting glass is broken or cracked. Trace 10 is located on a portion of window 8 that extends below the opening in door 6, so that it is out of view. A screening process such as is commonly used for the installation of rear window defrosters of automobiles is used. Trace 10 is preferably a silver trace having a width of about 1 mm. A trace 10 may preferably be placed on every window.

Figure 2:
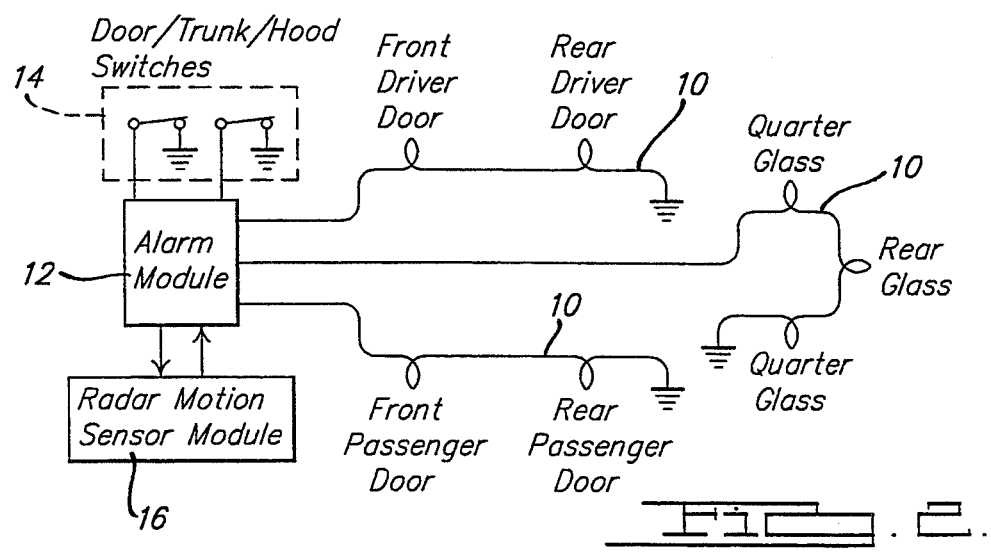
FIG. 2 is a schematic diagram of the preferred embodiment of the present invention.

Referring now to FIG. 2, an alarm system according to the present invention is shown. Alarm module 12 is electrically connected to several screened traces 10 for detecting glass breakage in any one of windows 8 in automobile 4. Traces 10 can be individually connected to alarm module 12 or several traces 10 can be branch connected in series. Alarm module 12 is connected to door, trunk and hood switches 14 which indicate if any of the doors, the hood or the trunk have been opened. A radar motion sensor 16 is also controlled by alarm module 12.

Figure 3:
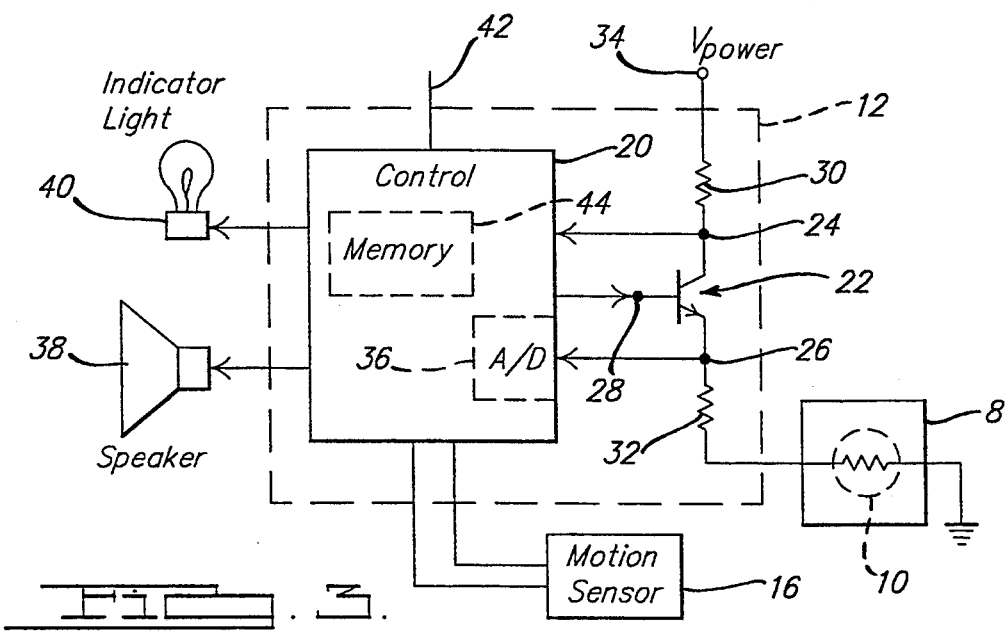
FIG. 3 is detailed diagram of the alarm module of a preferred embodiment of the invention.

Referring now to FIG. 3, alarm module 12 is shown in greater detail having two primary components, a controller 20 and a switch 22. Controller 20 is comprised of a microprocessor having several inputs, outputs and a memory 44. Switch 22 has three terminals; an input terminal 24, an output terminal 26, and a control terminal 28. Switch 22 is preferably an NPN silicon transistor, however, other switching devices such as a relay, a MOSFET or JFET may be used. Input terminal 24 is connected to a power supply 34. Preferably, a resistor 30 is connected between power supply 34 and input terminal 24 so that a voltage less than power supply voltage $V_{power}$ is present at input terminal 24. Control terminal 28 is driven by a control signal from controller 20. Output terminal 26 is connected to trace 10 and to an input of controller 20 comprising an analog-to-digital converter (A/D) 36 which is preferably integral with controller 20 but may also be a separate unit. Resistor 32 is useful in raising the input voltage if the threshold for A/D is higher than the voltage at output terminal 26. In production, the resistance value of resistor 32 can vary so that several different resistance values may be used to vary output terminal voltage. In addition, the patch resistance can be varied between 13–50 ohms.

Upon detection of intrusion, controller 20 is used to generate a control signal activating an audible alarm through a speaker 38 or other desirable function such as disabling an engine. If a fault in the switch 10 is detected, controller 20 activates a fault indicator light 40.

In operation, control means 20 is activated by control line 42 which, for example, can be a driver activated switch for activating an anti-theft system (not shown). Controller 20 controls the operation of switching means 22 by selectably driving control terminal 28 with a sufficient voltage to cause switch 22 to conduct (i.e., turn on) thereby supplying current to trace 10. Preferably, controller 20 is used to pulse the operation of switch 22 from an off state, to an on state and back to an off state. Controller 20 measures the voltage at output terminal 26 at different times which are later used for comparisons. The voltages measured at output terminal 26 can be fed directly to controller 20 if it is equipped with an analog input or changed to digital form by A/D 36 and then fed into controller 20 if controller 20 has a digital input. A first voltage is measured as a reference voltage when the system is first activated by control line 42 and switch 22 is in the conducting state (i.e., pulsed state). The first voltage value is stored in memory 44 and provides a base resistance value with the trace in a non-broken condition. After the initial measurement and switch 22 is back in the non-conducting state (i.e., non-pulsed), controller 20 then periodically measures a second voltage at the output terminal 26. After the second measurement, controller pulses switch 22 to the conducting state and periodically measures a third voltage at the output terminal 26. Controller 28 then compares the first and second voltage measurements and the first and third voltage measurements. If the second and third voltages or first and second voltages are equal, a short exists at output terminal 26 which implies that tampering with output terminal 26 has occurred. An audible alarm is then sounded. If the first and third voltage are substantially not equal, a short circuit or an open circuit exists at output terminal 26 indicating that trace 10 has been broken by glass breakage. An audible alarm will sound in this second situation.

The second and third measurements are preferably repeated at irregular intervals (e.g. 100–500 ms.). Thus, for an intruder to defeat the anti-theft system, he would have to know the exact output terminal voltage of the system at output terminal 26, and the exact time the voltages are measured by controller 20.

The resistance of trace 10 may vary with different environmental conditions (e.g., temperature or humidity) which causes the voltage at output terminal 26 to vary. It is preferred that the first measured reference voltage is remeasured and stored at longer intervals than the second and third voltage measurements, for example once every 10 minutes. This remeasuring of the first reference voltage prevents false alarms from temperature-induced changes in the voltage measured at output terminal 26.

After the detection of breakage, the alarm is activated for a fixed period of time, e.g., 2 minutes, to reduce drain on the vehicle battery. However, once a breakage of trace 10 occurs, no further breakage of traces in that branch can be detected. Therefore, a supplemental intrusion detection system, such as a microwave motion sensor 16, is activated after the initial alarm is deactivated. Microwave motion sensor 16 detects movement in the vehicle and activates the alarm accordingly. This prevents the problem of a would-be intruder from breaking a window and waiting until the audible alarm was deactivated and then returning to gain entry into the vehicle. Upon subsequent entry into the vehicle the radar motion detector 16 senses intrusion and reactivates the alarm.

The input terminal voltage can also be monitored by controller 20 to provide an indication of whether switch 22 is working properly. When switch 22 is in a non-conducting state the voltage at the input terminal is essentially the voltage of power supply 34. When switch 22 is in a conducting state the voltage is less than the non-conducting state. These voltages can be sampled throughout the period when the alarm system is operating to verify switch 22 is operating properly. If switch 22 is not operating properly, indicator light 40 will illuminate.

Several variations can be made to the above system without varying from the true spirit of the invention. For example, first, second, and third voltage readings rather than being one measurement, can be measured once or can be taken several times in a short time (e.g. 5 samples in a second) to get a statistically more accurate reading. The circuit can also disable an engine control.

What is claimed is:

1. An alarm system for detecting glass breakage having a power source comprising:
   switching means having an input terminal, an output terminal, and a control terminal, for switching between a conducting and non-conducting state, said input terminal electrically connected to said power source;
   an electrically conductive trace fixed to said glass, said trace electrically connected to said output terminal;
   control means electrically connected to said control terminal for controlling said switching means between said conducting and non-conducting states, which comprises means for measuring a reference output terminal voltage of said switching means while said switching means is in a first conducting state as a first initial measurement, for measuring a second output terminal voltage of said switching means while said switching means is in the non-conducting state after the first initial measurement, for measuring a third output terminal voltage of said switching means while said switching means is in a second conducting state after the first initial measurement, for comparing said reference voltage, said second voltage and said third voltage measurements to generate a control signal in response to a comparison of said voltages.

2. An alarm system as recited in claim 1 further comprising
   an audible alarm, wherein said alarm coupled to said control means;
   means for activating said alarm when said reference and third output terminal voltages are substantially not equal or when said reference and second output terminal voltages are substantially equal or when said second and third output terminal voltages are substantially equal.

3. An alarm system as recited in claim 2 further comprising
   means for deactivating said alarm after said alarm has been activated for a predetermined time;
   motion sensing means for detecting intrusion on a predetermined space;
   means for activating said motion sensor after said alarm has been deactivated; and
   means for reactivating said alarm upon detection of intrusion by said motion sensing means.

4. An alarm system as recited in claim 1 further comprising
   a resistor connected between said power source and said input terminal;
   means for measuring said input terminal voltage of said switching means;
   indicator means comprises an indicator coupled to said control means for indicating if said switching means is operating properly according to the measured input terminal voltage.

5. An alarm system as recited in claim 1 wherein said glass comprises tempered glass.

6. An alarm system as recited in claim 1 further comprising means for periodically measuring said reference output terminal voltage at a first interval.

7. An alarm system as recited in claim 1 further comprising means for periodically measuring said second output terminal voltage and said third output terminal voltage at a random interval substantially less than said first interval.

8. The alarm system as recited in claim 7 wherein said control means further comprises of an analog to digital converter.

9. The alarm system as in claim 1 wherein said control means comprises of a microprocessor.

10. An alarm system for an automotive vehicle having at least one window, a door, a passenger compartment and a power source comprising:
   a switching means having an input terminal, an output terminal, and a control terminal, for switching between a conducting and non-conducting state, said input terminal electrically connected to said power source;
   an electrically conductive screened trace formed on said at least one window, said trace electrically connected to said output terminal;
   an audible alarm, wherein said alarm coupled to a control means;
   wherein said control means electrically connected to said control terminal, said electrically conductive trace and said audible alarm for controlling said switching means between said conducting and non-conducting state, for measuring a reference output terminal voltage of said switching means while said switching means is in a first conducting state at a predetermined interval as a first initial measurement, for measuring a second output terminal voltage of said switching means while said switching means is in the non-conducting state after said first initial measurement, for measuring a third output terminal voltage of said switching means while said switching means is in a second conducting state after said first initial measurement, for activating said alarm when said reference and third output terminal voltages are substantially not equal, or for activating said alarm when said second and third output terminal voltages are substantially equal.

11. An alarm system as recited in claim 10 further comprising:
   a resistor connected between said power source and said input terminal;
   means for measuring the input terminal voltage of said switching means; and
   indicator means comprises an indicator coupled to said control means for indicating if said switching means is operating properly according to the measured input terminal voltage.

12. An alarm system as recited in claim 11 wherein said indicator means comprises a dashboard light.

13. An alarm system as recited in claim 10 further comprising means for activating said audible alarm in response to said door opening.

14. An alarm system as recited in claim 10 further comprising means for deactivating said alarm after said alarm has been activated;
   motion sensing means for detecting intrusion into the passenger compartment;
   means for activating said motion sensor after said alarm has been deactivated
   means for reactivating said alarm upon detection of intrusion by said motion sensing means.

15. A method detecting intrusion into an area having at least one panel of glass, a power source, an alarm, a control means, a switching means and an electrically conductive screened trace on said glass, the input terminal of said switching means connected to said power source, said screened trace electrically connected to the output terminal of said switching means, said control means coupled to the control terminal of said switching means, and said alarm coupled to said control means the method comprising the steps of:
   (A) switching the switching means to a first conducting state as a first initial measurement;
   (B) measuring a reference output terminal voltage from said switching means while said switching means is in the conducting state as said first initial measurement prior to any intrusion;
   (C) switching the switching means to the non-conducting state after said first initial measurement;
   (D) measuring a second output terminal voltage of said switching means while said switching means is in the non-conducting state;
   (E) switching the switching means to a second conducting state after said first initial measurement;
   (F) during said second conducting state, measuring a third output terminal voltage; and
   (G) activating said alarm if said reference and second output terminal voltages are substantially equal;
   (H) activating said alarm if said reference and third output terminal voltages are substantially unequal.

16. A method as recited in claim 15 further comprising the steps of:
   measuring the input terminal voltage of said switching means, said switching means have predetermined operating values;
   comparing said input terminal voltage with said known values;
   signalling a fault if said input terminal voltage value varies substantially from said predetermined values.

17. A method as recited in claim 15 further comprising the steps of activating said alarm for a predetermined amount of time;
   and thereafter, activating a microwave motion detector for retriggering said alarm upon the detection of motion within said vehicle.

18. A method as recited in claim 15 further comprising the step of repeating steps (C) through (H) at irregular intervals.

19. A method as recited in claim 15 further comprising the step of repeating steps (A) and (B) at a first interval which is longer than the irregular interval.

* * * * *